March 3, 1953 W. W. MOWER 2,630,371
PROCESS FOR THE MANUFACTURE OF MAGNESIUM PRODUCTS
Filed Sept. 29, 1947 2 SHEETS—SHEET 1
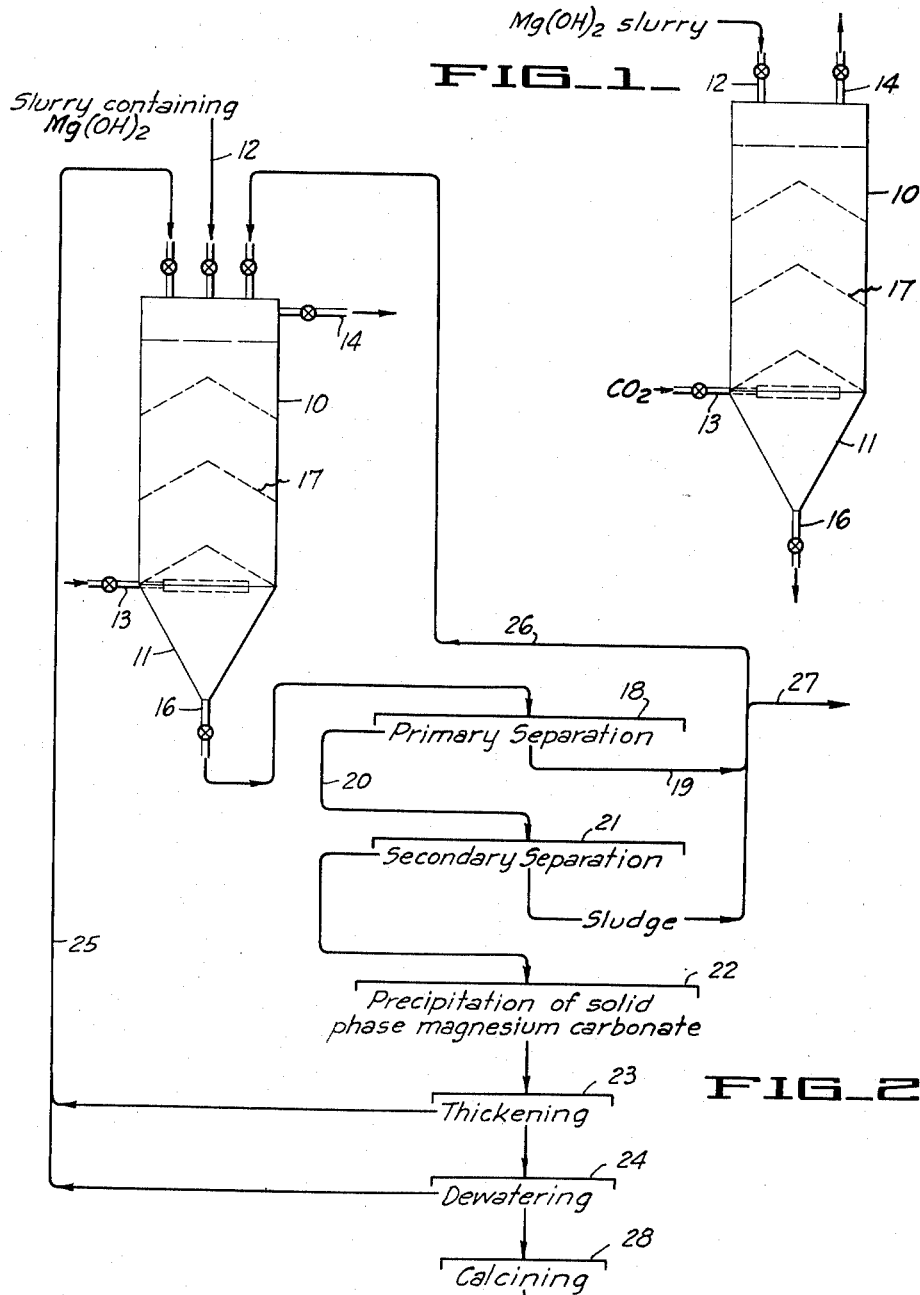
INVENTOR.
William W. Mower
BY Flehr & Swain
ATTORNEYS March 3, 1953    W. W. MOWER    2,630,371
PROCESS FOR THE MANUFACTURE OF MAGNESIUM PRODUCTS
Filed Sept. 29, 1947    2 SHEETS—SHEET 2
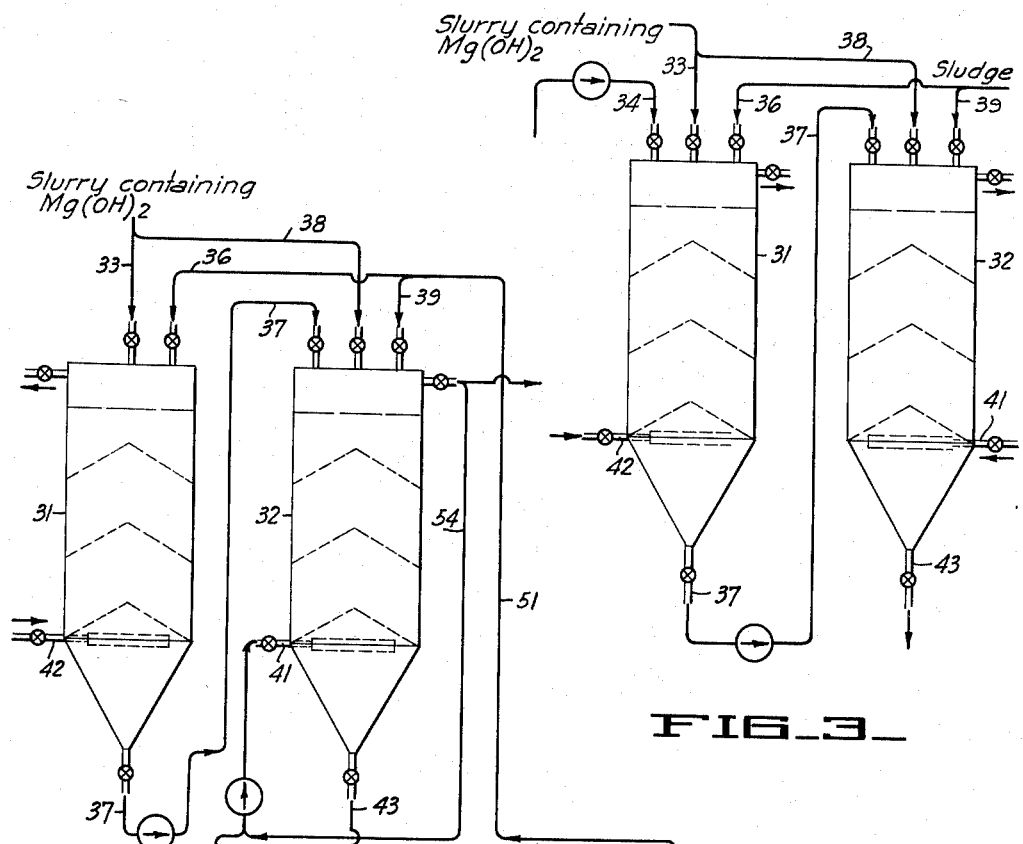
FIG_3_
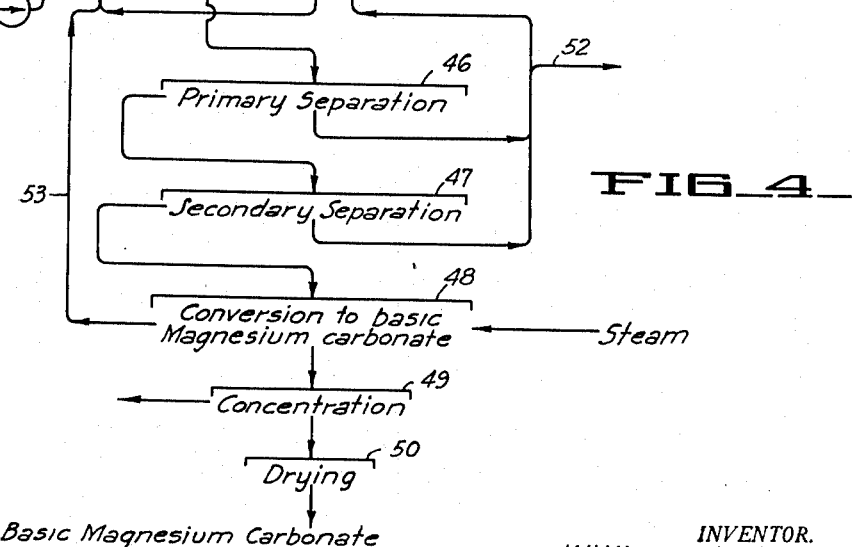
FIG_4_
INVENTOR.
William W. Mower
BY Flehr & Swain
ATTORNEYS Patented Mar. 3, 1953

2,630,371

UNITED STATES PATENT OFFICE 2,630,371

PROCESS FOR THE MANUFACTURE OF MAGNESIUM PRODUCTS

William W. Mower, Los Altos, Calif., assignor, by mesne assignments, to Merck & Co., Inc., Rahway, N. J., a corporation of New Jersey Application September 29, 1947, Serial No. 776,728

4 Claims. (Cl. 23—67)

This invention relates generally to processes for carbonating magnesium hydroxide slurries for the manufacture of solid phase magnesium carbonate or other magnesium compounds.

In the past two principal processes have been used commercially for the carbonation of magnesium hydroxide slurries. In one process a batch of calcium and/or magnesium hydroxide slurry is carbonated under pressure by contact with carbon dioxide containing gas, whereby the magnesium hydroxide is converted to magnesium bicarbonate in solution. The bicarbonate solution is then heated to precipitate magnesium carbonate. Pressures commonly used in this type of carbonation range from 40 to 75 p. s. i. Such pressure carbonation involves considerable expense because of the cost of the carbonating under pressure, and the labor involved in cleaning solid phase carbonate which tends to accumulate in the tanks and fittings, thus requiring frequent shut-downs for servicing and repair.

Where it is not desired to remove solid phase impurities as in the bicarbonate process described above, a second method has been used involving treatment of a batch of magnesium hydroxide slurry in a kettle at atmospheric pressure. Carbon dioxide gas is introduced into the kettle whereby during the period of carbonation solid phase neutral magnesium carbonate is formed together with magnesium bicarbonate. At the end of the carbonating operation the material is heated to an elevated temperature whereby it is converted to basic magnesium carbonate. As previously mentioned this method does not permit the removal of solid phase impurities because at the end of the carbonating operation the major part of the magnesium hydroxide has been converted to neutral magnesium carbonate.

It will be evident from the foregoing that there has been a commercial need for a carbonating operation capable of inexpensively and efficiently carbonating a magnesium hydroxide slurry to form magnesium bicarbonate solution, and which will afford a high yield and enable efficient removal of solid phase impurities prior to formation of solid phase carbonate. It is an object of the present invention to provide such a process, and particularly one which will enable relatively high capacity and low power consumption for a given size of equipment employed.

Another object of the invention is to provide a novel process of the above character which operates continuously rather than by the batch method.

Further objects of the invention will appear from the following description in which the preferred embodiments have been set forth in detail in conjunction with the accompanying drawings.

Referring to the drawings:

Figure 1 is a side elevational diagrammatic view illustrating apparatus for carrying out the present process.

Figure 2 is a flow sheet illustrating a process incorporating the apparatus of Figure 1.

Figure 3 is a view like Figure 1 but showing a modification of the equipment.

Figure 4 is a flow sheet showing another process incorporating the apparatus of Figure 3.

The present invention involves a continuous carbonating operation carried out under specially controlled and critical conditions. In the past it has been known that when a magnesium hydroxide slurry is contacted with a carbon dioxide containing gas at atmospheric pressure or higher pressures ranging up to say 50 p. s. i., there is initial and relatively rapid conversion of some of the magnesium hydroxide to magnesium bicarbonate, but upon continuing carbonation the initially formed magnesium bicarbonate is in part converted to solid phase neutral magnesium carbonate by reaction with the hydroxyl ions present. Thus a carbonation curve drawn between percentage of magnesium bicarbonate in solution on the vertical axis and time on the horizontal axis, rises rapidly during the initial part of the carbonating operation, and then drops back from a peak value, because of the formation of solid phase magnesium trihydrate. I have discovered that it is possible to make use of this phenomenon in such a manner as to provide continuous and substantially complete conversion of magnesium hydroxide slurry to magnesium bicarbonate, with a minimum formation of solid phase neutral carbonate.

The invention can be better understood after an explanation of the apparatus shown in Figure 1. This apparatus consists of a vertical tank 10 having a lower conically shaped portion 11, and adapted to receive a continuous stream of magnesium hydroxide slurry through the pipe 12. Suitable carbon dioxide containing gas, such as flue gas, can be introduced into the lower portion of the tank through pipe 13. Pipe 14 serves to vent off gas from the top of the tank. Pipe 16 is for continuous removal of magnesium bicarbonate solution. Within the tank it is desirable to provide vertically spaced perforated baffles 17 in order to break up the gas into small bubbles, and in order to secure the desired countercurrent action as will be presently described.

When using the apparatus of Figure 1 to carry out the present invention, a suitable magnesium hydroxide slurry is supplied at a continuous rate through the pipe 12. Carbon dioxide containing gas such as flue gas containing from 8 to 28 percent (by volume) carbon dioxide is also supplied continuously through the pipe 13, and gas is permitted to continuously vent from the top of the tank through pipe 14. The drainage of the magnesium bicarbonate solution through pipe 16 is at a proper constant rate to maintain the surface of the liquid column within the tank at a desired level, which should be near the top of the tank. Assuming that operation is at atmospheric pressure then the gas is permitted to freely vent through pipe 14 in order to avoid a back pressure. Assuming that no additional water is being introduced into the tank then the slurry in a typical instance may contain 0.55 percent magnesium hydroxide.

It will be evident that the carbonating action is affected by a number of factors. Thus it is affected by the rate with which magnesium hydroxide is introduced into the tank, and the rate of introduction of carbon dioxide, assuming that the pressure of operation and the temperature are maintained constant. According to my invention the magnesium hydroxide is introduced at such a rate that there is present at all times sufficient magnesium hydroxide to induce rapid promotion of the reaction

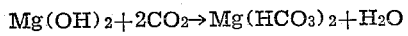

$$Mg(OH)_2 + 2CO_2 \rightarrow Mg(HCO_3)_2 + H_2O$$

However the rate of introduction is such that the amount of magnesium hydroxide present at any one point in the tank is insufficient to produce the reaction

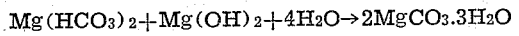

$$Mg(HCO_3)_2 + Mg(OH)_2 + 4H_2O \rightarrow 2MgCO_3 \cdot 3H_2O$$

In other words the reaction just indicated is not permitted to proceed to any appreciable extent to form solid phase magnesium carbonate. When any appreciable amount of neutral magnesium carbonate is permitted to form then this material is not reconverted back to bicarbonate but is removed through the pipe 16. Formation of any substantial amount of neutral magnesium carbonate reduces the efficiency of recovery, and in addition formation of such solid phase carbonate in the carbonating tank greatly reduces the efficiency of carbonation and the capacity of the equipment.

I have found that it is possible to maintain the proper condition of critical equilibrium within the tank 10, by controlling the rates of introduction of magnesium hydroxide and of the carbon dioxide containing gas, and that under such conditions it is possible to obtain near 100% conversion. Within the column of material undergoing treatment in the tank, concentration of solid phase magnesium hydroxide is greatest near the upper part of the column, and decreases gradually toward the lower end of the column. At the lower end of the column unconverted magnesium hydroxide has been reduced to a minimum. Concentration of carbon dioxide and carbonic acid in the column undergoing treatment is greatest for the lower portion of the column, near the point of introduction, and gradually decreases upwardly to a relatively lower value in the upper part of the column. Thus magnesium hydroxide entering the upper end of the column and progressing downwardly toward the lower end, is subjected to a continually increasing concentration of carbon dioxide and carbonic acid. In addition to the foregoing and because of the time element involved, the concentration of magnesium bicarbonate in solution in the upper part of the column is at a minimum, and at a maximum in the lower part of the column near the point of withdrawal. Therefore when the magnesium bicarbonate concentration is at a maximum the amount of magnesium hydroxide in contact with the solution is at a minimum, which is a condition tending to prevent formation of neutral magnesium carbonate. Conversion actually takes place on the initial portion of the carbonation curve previously described, that is up to and preferably slightly beyond the peak of the curve.

In actual practice proper operation and regulation of the flow rates can be determined by quantitative analysis of material being drawn off through the pipe 16. Of the total magnesium content of this material, about 2% to 5% should be solid phase magnesium, and the remaining 95% to 98% should be in the liquid phase. Under such conditions the conversion is efficient and the capacity of the equipment is relatively high.

The method described above with reference to Figure 1 can be used to advantage in processes for the manufacture of relatively pure magnesium products from sources of raw material such as dolomite, brucite, magnesite, serpentine, olivine, or other slurries containing magnesium hydroxide. Such a process is disclosed for example in Gloss 2,390,095, entitled "Process for the Manufacture of Magnesium Products." This process involves generally calcining a magnesium containing ore such as dolomite, forming a slurry of the calcined material, carbonating the slurry to form magnesium bicarbonate solution together with solid phase impurities, separating out the solid phase impurities from the solution, and then subjecting the solution to aeration at atmospheric pressure to precipitate neutral magnesium carbonate. In processes of this type the cost of carrying out the carbonating operation is a substantial factor in the cost of producing the magnesium compounds. Furthermore precipitation of solid phase carbonate from the magnesium bicarbonate solution by aeration leaves an effluent containing considerable residual magnesium bicarbonate. The return of this effluent to the process involves a particular problem.

Referring particularly to the flow sheet of Figure 2, a magnesium hydroxide slurry is shown being supplied to the pipe 12 of the tank 10, and pipe 16 is shown delivering the magnesium bicarbonate solution to the primary separating operation 18. This operation can be carried out hydraulically whereby sludge 19 is withdrawn as an underflow, and an effluent 20 containing the magnesium bicarbonate solution withdrawn as an overflow. The effluent is shown being subjected to a secondary operation 21 for removal of remaining solid phase material. This operation can conveniently be carried out by passing the effluent through a filter press or like pressure filter. Prior to or during primary separation 18 a suitable flocculating agent can be added.

The clarified effluent from 21 is shown being supplied to the precipitating operation 22, where the magnesium bicarbonate is precipitated as solid phase magnesium carbonate. As previously stated this can be carried out at normal temperatures and pressures by an aeration method such as disclosed in Gloss 2,390,095.

Following the precipitating operation 22 the material is subjected to thickening 23 followed by dewatering 24. The thickening may be carried out hydraulically, and dewatering by a suitable centrifuge. The effluent from these operations contains considerable residual magnesium bicarbonate, as for example from 20% to 45% of the total magnesium bicarbonate present before aeration. This effluent is returned to the process, preferably as a continuous stream directly into the upper part of the tank 10 by way of line 25. When introduced in this manner the bicarbonate solution does not contact the magnesium hydroxide of the slurry except under conditions of carbonation. I have discovered that if this effluent is returned to the process in operations preceding carbonation, as for example to provide a certain amount of water for forming or diluting the original slurry, substantial amounts of solid phase neutral magnesium carbonate are formed prior to carbonation, thus generally interfering with the efficiency of the process. Introduction as a continuous stream directly into the tank 10 does not materially affect the efficiency of carbonation or the percentage of solid phase neutral magnesium carbonate withdrawn with the bicarbonate solution from pipe 16.

As previously mentioned the small amount of solid phase magnesium carbonate in the material drawn off through pipe 16 is in the form of neutral magnesium carbonate. This neutral magnesium carbonate therefore becomes a part of the sludge removed in the separating operations 18 and 21. I have found that it is possible and desirable to continuously return a substantial part of this sludge back to the carbonating operation as indicated by line 26. Contrary to what might be expected I have found that this solid phase neutral magnesium carbonate returned in this fashion does not detrimentally affect the process. Line 27 represents removal of a certain part of the sludge from the process, thereby avoiding an objectionable build-up of impurities in the system.

An example of actual operation is as follows: A slurry was supplied to the carbonating tank 10 analyzing as follows:

| | Per cent |
|---|---|
| Magnesium hydroxide | 5.5 |
| Calcium carbonate | 0.15 |
| Other solid phase impurities | 0.25 |
| Water | 94.1 |

The tank 10 was cylindrical in form, having an overall height of 20 feet, and provided with three conical baffles.

The above slurry was supplied continuously to the top of the tank at a rate of about 4½ gallons per minute. Material was removed from the bottom of the tank at a sufficient rate to maintain the liquid level within the tank about 30 inches from the tank top. Flue gas containing 14% carbon dioxide was supplied continuously to the lower portion of the tank at a rate of 400 cubic feet per minute, (calculated at atmospheric pressure). Returned effluent was continuously introduced into the top of the tank by way of line 25 at a rate of 60 gallons per minute, and analyzing about 0.5% dissolved magnesium bicarbonate. Sludge was also continuously introduced into the top of the tank at a constant rate of 5 gallons per minute, and for one typical period of operation analyzed as follows:

| | Percent |
|---|---|
| Neutral magnesium carbonate | 50 |
| Calcium carbonate plus impurities | 50 |

Under the conditions described above an analysis of the material withdrawn through pipe 16 revealed that of the total magnesium content present there was 4% solid phase magnesium in the form of neutral magnesium carbonate, and 96% dissolved magnesium in the form of magnesium bicarbonate.

The precipitating operation 18 was carried out according to Gloss 2,390,095, that is by aeration at atmospheric pressure. The effluent 25 withdrawn from the thickening and dewatering operations 23 and 24 analyzed about 0.5% residual magnesium bicarbonate, all of which was continuously returned to the carbonating tank 10.

It is not difficult in actual practice to maintain proper critical control of the carbonating operation. A number of factors affect this operation and may disturb the desired balance. Any change in the rate of introduction of slurry or of the magnesium hydroxide content of the same, requires changes in other controlling factors, such a change in the rate of introduction of carbon dioxide containing gas, or the rate of withdrawal at 12. It has been found possible to make periodic analyses of the material withdrawn through pipe 16 in order to determine the relative difference between solid phase and dissolved magnesium contents. Should the solid phase magnesium content depart from the previously mentioned range of about 2% to 5% of the total magnesium content, then suitable correction can be made to restore the operation to proper conditions, as by adjusting the rate of introduction of slurry with a corresponding adjustment of the rate of withdrawal through pipe 16, or adjusting the rate of introduction of carbon dioxide containing gas. Increasing the percentage of carbon dioxide in the gas introduced through 13 makes possible the withdrawal of an effluent through pipe 16 containing an increased percentage of magnesium bicarbonate. Likewise it is possible to increase the percentage of magnesium bicarbonate in the continuously withdrawn effluent by operating at pressures above atmospheric. Thus by using a flue gas containing 20% (by volume) carbon dioxide and operating at atmospheric pressure the percentage of magnesium bicarbonate in the effluent withdrawn through pipe 16 can be raised to about 2%. Using a carbonating gas containing 20% carbon dioxide, maintenance of a pressure within the tank of the order of 60 p. s. i. will result in an effluent being withdrawn through pipe 16 containing about 3½ magnesium bicarbonate, in comparison with 2% obtained at atmospheric pressure.

The remarkable efficiency of carbonation obtained by my invention makes possible a great simplification with respect to the equipment required, including particularly the carbonating tank. In many instances one stage of carbonation will suffice. It is possible however to carry out carbonation in successive stages in the manner illustrated in Figure 3. In this instance the two carbonating tanks 31 and 32 are identical and each is constructed the same as tank 10 of Figure 1. A slurry containing magnesium hydroxide is continuously introduced by line 33 into the top of tank 31, and this tank may also receive returned effluent by line 34, and sludge by line 36, assuming that the tanks are being utilized in the general process of Figure 2. Line 37 removes material from the lower end of the first tank and continuously reintroduces the same into the top of tank 32. Tank 32 also receives fresh slurry at a constant rate as indicated by line 38. Again assuming use with the process of Figure 2, some sludge is shown introduced into the tank 32 by way of line 39, corresponding to the sludge 26 of Figure 2. Flue gas introduced into the second tank 32 by line 41 can be relatively rich in carbon dioxide, containing for example 26% $CO_2$ (by volume) as compared to 14% for tank 31 through line 42. The final carbonated material is withdrawn by line 43 from tank 32.

In operating two stage carbonation according to Figure 3 each stage is controlled in the same manner as the one stage of Figure 1. Thus control is such that the material withdrawn at 37 has a total magnesium content of which about 2% to 5% is in solid phase. The same applies to the material withdrawn at 32. Such control can be maintained in both tanks because they are both supplied with slurry containing unreacted magnesium hydroxide.

Figure 4 illustrates a complete process utilizing the two tanks as shown in Figure 3. Thus the bicarbonate solution withdrawn from the tank 32 by pipe 43 is delivered to the primary separating operation 46, and the effluent from this operation is supplied to the secondary separating operation 47. These operations can be similar to operations 18 and 21 of Figure 2. Effluent from operation 47 is supplied to the operation 48, where the bicarbonate solution is heated to convert the same to basic magnesium carbonate. The slurry thus obtained is subjected to concentration 49 and the solids then subjected to drying 50 to produce the final basic magnesium carbonate product.

Sludge from the separating operations 46 and 47, as in the case of Figure 2, is returned in part (line 51) to the tanks 31 and 32, and in part (line 52) discarded. The first tank 31 is supplied with ordinary flue gas containing say 27% (by volume) carbon dioxide. The operation 48 is carried out in a closed vessel and the evolved gas, which is relatively rich in carbon dioxide, is supplied to the tank 32 as indicated by line 53. Some of the gas vented from the top of tank 32 can be returned and reintroduced into the lower part of the tank as indicated by line 54. In a typical instance the gas recovered from operation 48 will contain 75% (by volume) carbon dioxide.

Effluent from operation 49 will be relatively low in bicarbonate content because of the use of heat in the precipitating operation. If desired however such effluent can be returned to tanks 31 and 32 in the same manner as in Figure 2.

Unless otherwise stated herein, all percentages are by weight.

I claim:

1. In a process for the manufacture of magnesium products, the steps which comprise, continuously introducing solid phase magnesium hydroxide in an aqueous slurry containing solid phase impurities into the upper portion of a column of aqueous material being carbonated, continuously introducing carbon dioxide into the lower portion of said column whereby bubbles of carbon dioxide pass upwardly through said column and an initial reaction takes place producing soluble magnesium bicarbonate, continuously withdrawing carbonated material from the lower portion of said column at a rate maintaining a substantially constant level of aqueous material in said column, controlling the rate of introduction of said magnesium hydroxide and said carbon dioxide into said column so that the supply of magnesium hydroxide is only slightly greater than the amount theoretically required to combine with the carbon dioxide to form magnesium bicarbonate in the initial reaction and so that the carbonated material withdrawn from the lower portion of said column contains an amount of solid phase magnesium compounds which is between 2 and 5% by weight of the total amount of magnesium compounds in said withdrawn carbonated material, the remainder of said total being substantially all dissolved magnesium bicarbonate, and separating said solid phase magnesium compounds and solid phase impurities from said withdrawn carbonated material to produce an aqueous solution of substantially pure magnesium bicarbonate.

2. In a process for the manufacture of magnesium products, the steps which comprise, continuously introducing solid phase magnesium hydroxide in an aqueous slurry containing solid phase impurities into the upper portion of a column of aqueous material being carbonated, continuously introducing carbon dioxide into the lower portion of said column whereby bubbles of carbon dioxide pass upwardly through said column and an initial reaction takes place producing soluble magnesium bicarbonate, continuously withdrawing carbonated material from the lower portion of said column at a rate maintaining a substantially constant level of aqueous material in said column, controlling the rate of introduction of said magnesium hydroxide and said carbon dioxide into said column so that the supply of magnesium hydroxide is only slightly greater than the amount theoretically required to combine with the carbon dioxide to form magnesium bicarbonate thereby substantially preventing the reaction of magnesium hydroxide with magnesium bicarbonate to form magnesium carbonate trihydrate and so that the carbonated material withdrawn from the lower portion of said column contains an amount of solid phase magnesium compounds which is between 2 and 5% by weight of the total amount of magnesium compounds in said withdrawn carbonated material, the remainder of said total being substantially all dissolved magnesium bicarbonate, and separating said solid phase magnesium compounds and solid phase impurities from said withdrawn carbonated material to produce an aqueous solution of substantially pure magnesium bicarbonate.

3. In a process for the manufacture of magnesium products, the steps which comprise, continuously introducing solid phase magnesium hydroxide in an aqueous slurry containing solid phase impurities into the upper portion of a column of aqueous material being carbonated, continuously introducing carbon dioxide into the lower portion of said column whereby bubbles of carbon dioxide pass upwardly through said column and an initial reaction takes place producing soluble magnesium bicarbonate, continuously withdrawing carbonated material from the lower portion of said column at a rate maintaining a substantially constant level of aqueous material in said column, controlling the rate of introduction of said magnesium hydroxide and said carbon dioxide into said column so that the supply of magnesium hydroxide is only slightly greater than the amount theoretically required to combine with the carbon dioxide to form magnesium bicarbonate thereby substantially preventing the reaction of magnesium hydroxide with magnesium bicarbonate to form magnesium carbonate trihydrate and so that the carbonated material withdrawn from the lower portion of said column contains an amount of solid phase magnesium compounds which is between 2 and 5% by weight of the total amount of magnesium compounds in said withdrawn carbonated material, the remainder of said total being substantially all dissolved magnesium bicarbonate, and separating said solid phase magnesium compounds and solid phase impurities from said withdrawn carbonated material to produce an aqueous solution of substantially pure magnesium bicarbonate, precipitating and recovering solid phase magnesium carbonate from said solution to leave an aqueous effluent still containing a substantial amount of magnesium bicarbonate and returning said effluent to the upper portion of said column.

4. In a process for the manufacture of magnesium products, the steps which comprise, continuously introducing solid phase magnesium hydroxide in an aqueous slurry containing solid phase impurities into the upper portion of a column of aqueous material being carbonated, continuously introducing carbon dioxide into the lower portion of said column whereby bubbles of carbon dioxide pass upwardly through said column and an initial reaction takes place producing soluble magnesium bicarbonate, continuously withdrawing carbonated material from the lower portion of said column at a rate maintaining a substantially constant level of aqueous material in said column, controlling the rate of introduction of said magnesium hydroxide and said carbon dioxide into said column so that the supply of magnesium hydroxide is only slightly greater than the amount theoretically required to combine with the carbon dioxide to form magnesium bicarbonate thereby substantially preventing the reaction of magnesium hydroxide with magnesium bicarbonate to form magnesium carbonate trihydrate and so that the carbonated material withdrawn from the lower portion of said column contains an amount of solid phase magnesium compounds which is between 2 and 5% by weight of the total amount of magnesium compounds in said withdrawn carbonated material, the remainder of said total being substantially all dissolved magnesium bicarbonate, and separating said solid phase magnesium compounds and solid phase impurities from said withdrawn carbonated material to produce an aqueous solution of substantially pure magnesium bicarbonate and a sludge containing solid phase magnesium compounds and solid phase impurities, precipitating and recovering solid phase magnesium carbonate from said solution to leave an aqueous effluent still containing a substantial amount of magnesium bicarbonate and returning said effluent and a substantial portion of said sludge to the upper portion of said column.

WILLIAM W. MOWER.

REFERENCES CITED

The following references are of record in the file of this patent:

UNITED STATES PATENTS

| Number | Name | Date |
|--------|------|------|
| 654,393 | Handy | July 24, 1900 |
| 934,418 | Sissom | Sept. 28, 1909 |
| 1,101,772 | Young | June 30, 1914 |
| 1,971,909 | Greider | Aug. 28, 1934 |
| 2,390,095 | Gloss | Dec. 4, 1945 |
| 2,409,297 | McGarvey | Oct. 15, 1946 |

FOREIGN PATENTS

| Number | Country | Date |
|--------|---------|------|
| 548,197 | Great Britain | Sept. 30, 1942 |

OTHER REFERENCES

Mellor: Comprehensive Treatise on Inorganic and Theoretical Chemistry, vol. 4, pages 360-1, 1923, Longmans, Green & Co., New York, New York.